April 24, 1951      D. ZSCHOKKE      2,550,634

DEVICE FOR PHASE MODULATION

Filed March 23, 1948

INVENTOR
DIETHELM ZSCHOKKE
BY *Robert E. Burns*
ATTORNEY

Patented Apr. 24, 1951

2,550,634

UNITED STATES PATENT OFFICE 2,550,634

DEVICE FOR PHASE MODULATION

Diethelm Zschokke, Solothurn, Switzerland, assignor to Autophon Aktiengesellschaft, Solothurn, Switzerland Application March 23, 1948, Serial No. 16,512
In Switzerland April 3, 1947

4 Claims. (Cl. 332—23)

Circuits are known which enable to modulate the frequency of an alternating voltage by modulating its phase, the instantaneous phase shift being in advance with a positive modulating voltage and in retardation with a negative modulating voltage with respect to the carrier frequency.

For communication purposes, it is desirable to apply phase departures of 800 or more angular degrees, i. e. the instantaneous advance or retardation of phase should total up to several periods. The technical modulation methods known up to now do not enable to produce directly such considerable shifts. Known modulation circuits enable phase departures of ±45° or ±90°. Bridge circuits are also known enabling to produce a phase departure of ±180°, i. e. a complete cycle. In order to obtain phase departures of several hundred angular degrees, a low carrier frequency is used, such frequency being multiplied after modulation, the phase departure being then increased in the same proportion. A peculiarity of known arrangements for phase modulation is that their circuit may not be loaded at all or to a very small extent.

The present invention relates to a device with loadable circuits and in which a maximum phase departure of a complete cycle is obtained.

The invention relates to a device for phase modulation and it is characterised in that the input voltage, constant with respect to magnitude and frequency, is supplied to an oscillating circuit which is coupled with two other oscillating circuits, one of which comprises a variable reactance controlled by the modulating voltage and which varies the voltage, induced in this circuit, in function of the modulating voltage and in that in the other circuit such a back voltage, also constant with respect to magnitude and frequency is induced by the input voltage that in circuits connected in series appears an output voltage which is constant with respect to magnitude and the phase shift of which with respect to the input voltage is a function of the modulating voltage. Particularly, the phase modulation is obtained in that the magnitude of the back voltage amounts to half the resonance voltage in the variable oscillating circuit and in that it possesses a phase shift with respect to this resonance voltage of an integer multiple of $\pi$. If the coupling of the variable oscillating circuit with the input circuit is loss-free and inductive or capacitive, the induced resonance voltage possesses a phase shift of ±90° with respect to the input voltage. In the case of loss-containing coupling a phase shift different from 90° is obtained. Such phase shift is of no moment for the purpose of phase modulation. If such a device is loaded with an impedance at the output, a mutual influence of the coupled oscillating circuit follows which may, however, be compensated by introducing a further impedance. This makes the device loadable to a large extent. The maximum phase departure obtainable with the device is ±180°, i. e. a complete cycle.

An executional form of the invention is explained, by way of example, with reference to the drawing.

Figure 1:
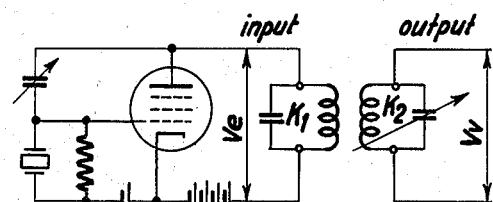
Fig. 1 illustrates the coupling of a fixed and of a variable oscillating circuit.

In Fig. 1 is represented the coupling of two oscillating circuits $K_1$ and $K_2$. A voltage $V_e$ constant with respect to magnitude and frequency is supplied to the fixed oscillating circuit $K_1$. The oscillating circuit $K_2$ comprises a variable reactance.

Figure 2:
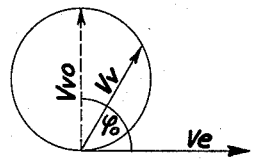
Fig. 2 shows the corresponding voltage vector diagram.

Fig. 2 shows the corresponding vector diagram. If the oscillating circuit 2 is tuned to resonance, a voltage $V_{vo}$ is induced, the phase angle $\varphi_0$ of which is 90° with respect to the input voltage $V_e$. If the reactance of the oscillating circuit $K_2$ is varied and thus the oscillating circuit de-tuned, the magnitude and phase of voltave $V_v$ is altered and the tip of the voltage vector travels over a circle in a known manner. If the reactance is variable between $-\infty$ and $+\infty$, a variable phase shift from 0 to +180° is obtained with respect to the input voltage $V_e$.

Figure 4:
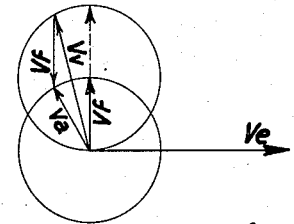
Fig. 4 shows the vector diagram of the combined voltages.

In order to obtain a phase departure of 360°, the variable back voltage $V_v$ is combined with the fixed back voltage $V_f$, as shown in Fig. 4. This fixed back voltage possesses with respect to the variable voltage $V_{vo}$ at resonance a phase shift equal to an integer, multiple of $\pi$, i. e. a phase angle 0 or 180° and the magnitude of voltage $V_f$ is equal to half of the voltage $V_{vo}$. If the voltages $V_f$ and $V_{vo}$ are in phase, the voltage $V_f$ is subtracted from $V_{vo}$, if said voltages are in opposite phase they are added. Thus, the resulting voltage $V_a$ is constant and equal to voltage $V_f$; in case of variation of voltage $V_v$, the arrow tip of vector $V_a$ rotates through a complete circle.

Figure 3:
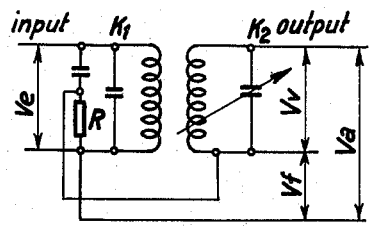
Fig. 3 shows the tapping of a back voltage in a device according to Fig. 1.

In Fig. 3 is represented by way of example an executional form of the device for producing the back voltage $V_f$. The voltage $V_f$ is being tapped by means of a voltage divider over a resistance R from the oscillating circuit $K_1$ to which the fixed input voltage $V_e$ is supplied, the resistance being connected in series with the oscillating circuit $K_2$. The back voltage $V_f$ may also be tapped from an oscillating circuit $K_3$, which is coupled in a fixed manner with the oscillating circuit $K_1$, the oscillating circuits $K_2$ and $K_3$ being connected in series in suitable phase relation. The fixed input voltage $V_e$ is preferably being produced in a known way, by means of a quartz generator. The oscillating circuits $K_2$ and $K_3$ are coupled with the oscillating circuit $K_1$ in a fixed manner. In the variable oscillating circuit $K_2$ preferably the capacity is being varied. Particularly, the variation of the oscillating circuit may be obtained by means of a controlled reactance, as explained, for example, in the U. S. A. patent application Ser. No. 132,252, filed March 5, 1948, and to which the low frequency modulating voltage is supplied. Then, the controlled reactance varies the induced voltage in function of the modulating voltage.

Figure 5:
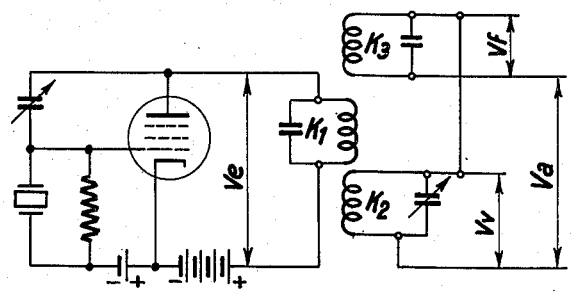
Fig. 5 shows a device for phase modulation with three coupled oscillating circuits.
Figure 6:
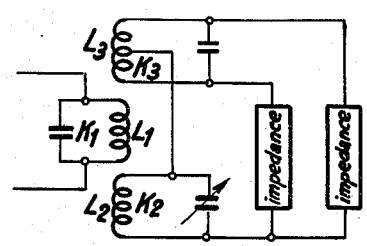
Fig. 6 shows the compensation of a mutual influence of the coupled circuits according to Fig. 5 due to a load impedance.
Figure 7:
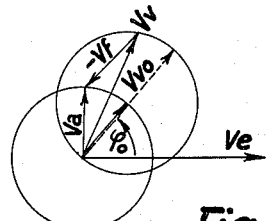
Fig. 7 shows the vector diagram, in case of a loss-free coupling of the circuits.

If the device according to Fig. 5 is loaded at the output with an impedance $Z_a$ (Fig. 6), a mutual influence of the two oscillating circuits takes place through such coupling. Such influence is being compensated by connecting half the voltage of self induction $L_3$ with the oscillating circuit $K_2$, a second impedance $Z_a'$ being arranged in the oscillating circuit. This enables to obtain a device which is loadable at will within a wide range. It has been found convenient to arrange the self induction coils of the three oscillating circuits on a cylinder, the self induction $L_1$ being arranged movably between the two fixed coils $L_2$ and $L_3$. This enables a very precise adjustment of phase relation between the back voltage of oscillating circuit $K_3$ and the resonance voltage in the variable oscillating circuit $K_2$.

The oscillating circuits $K_1$, $K_2$ and $K_3$ may, instead of being of a purely inductive nature, be coupled in a different way. If, for example, the oscillating circuits $K_2$ and $K_3$ are coupled to the oscillating circuit $K_1$ over impedances, the phase angle $\varphi_0$ of the resonance voltage $V_{vo}$ with respect to the input voltage $V_e$ will be no more 90°, but any angle. The coupling of circuit $K_3$ to the oscillating circuit $K_1$ has to be done in such a manner that the voltage induced in circuit 3 possesses the same phase relation with respect to the voltage $V_e$ as the resonance voltage $V_{vo}$. No influence or any disadvantageous action on the phase modulation is being produced by such phase relation.

What I claim is:
1. In a device for phase modulation, a first oscillating circuit, a lead-in means for the input voltage to said first oscillating circuit, a second oscillating circuit, a third oscillating circuit, said second and said third oscillating circuits being coupled with said first oscillating circuit, a variable reactance in said second oscillating circuit, said reactance being controlled by the modulating voltage, and said second and said third oscillating circuits being series connected.

2. In a device for phase modulation, a first oscillating circuit, a lead-in means for the input voltage to said first oscillating circuit, a second oscillating circuit, a third oscillating circuit, said second and said third oscillating circuits being coupled with said first oscillating circuit, a variable capacitance in said second oscillating circuit, said capacitance being controlled by the modulating voltage, and said second and said third oscillating circuits being series connected.

3. In a device for phase modulation, a first oscillating circuit, a lead-in means for the input voltage to said first oscillating circuit, a second oscillating circuit, a third oscillating circuit, said second and said third oscillating circuits being coupled with said first oscillating circuit, a variable capacitance in said second oscillating circuit, said capacitance being controlled by the modulating voltage, and said second and said third oscillating circuits being series connected, a connection between the middle of the inductance of said third oscillating circuit and said second oscillating circuit, a first impedance at the output of the series connection of said second with said third oscillating circuit, and a second impedance in said third oscillating circuit.

4. In a device for phase modulation, a first oscillating circuit, a lead-in means for the input voltage to said first oscillating circuit, a second oscillating circuit, a third oscillating circuit, said second and said third oscillating circuits being coupled with said first oscillating circuit, a variable reactance included in said second oscillating circuit, said reactance being controlled by the modulating voltage, and said second and said third oscillating circuits being series connected, a coil included in each of said three oscillating circuits and forming a part of said circuits, said three oscillating circuits being inductively coupled with one another by means of said coils, the coil of the first oscillating circuit being adjustably arranged with regard to the coils of the two other oscillating circuits.

DIETHELM ZSCHOKKE.

REFERENCES CITED

The following references are of record in the file of this patent:

UNITED STATES PATENTS

| Number | Name | Date |
|---|---|---|
| 2,374,810 | Fremlin | May 1, 1945 |
| 2,430,126 | Korman | Nov. 4, 1947 |
| 2,436,834 | Stodola | Mar. 2, 1948 |
| 2,461,307 | Antalek | Feb. 8, 1949 |